Aug. 13, 1940.  S. SCHNELL  2,211,438
AUTOMATIC LEVERAGE RATIO CHANGING MECHANISM
Filed Feb. 4, 1939
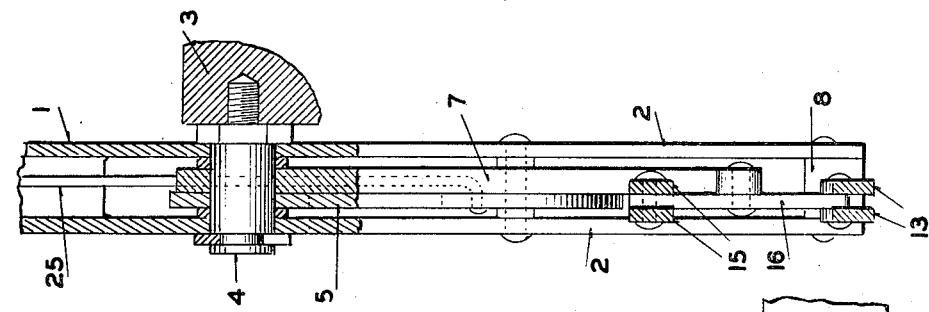
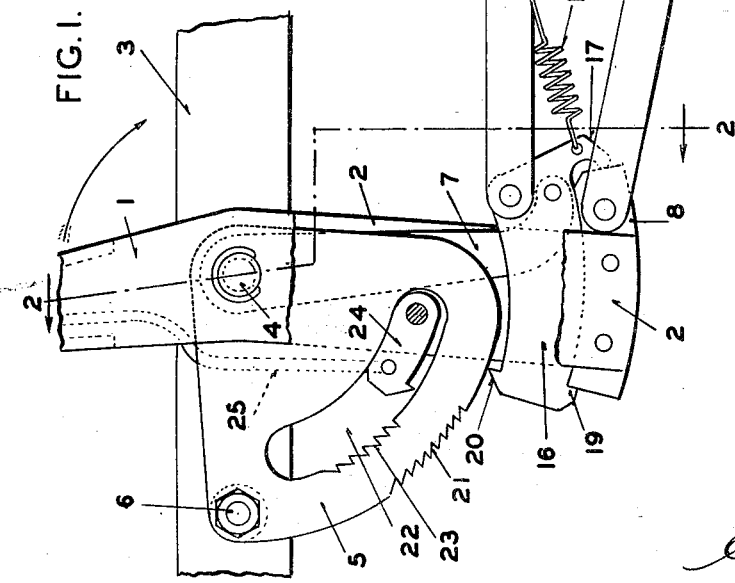
INVENTOR
STEVE SCHNELL
BY
*E. E. Huffman*
ATTORNEY Patented Aug. 13, 1940

2,211,438

UNITED STATES PATENT OFFICE 2,211,438

AUTOMATIC LEVERAGE RATIO CHANGING MECHANISM

Steve Schnell, St. Louis, Mo., assignor to Wagner Electric Corporation, St. Louis, Mo., a corporation of Delaware Application February 4, 1939, Serial No. 254,550

12 Claims. (Cl. 74—516)

My invention relates to leverage mechanism and more particularly to such a mechanism wherein the leverage ratio may be automatically changed.

One of the objects of my invention is to provide improved means for changing the leverage ratio between an actuating member and an actuated mechanism which is automatically operable in accordance with a predetermined transmitted force.

Another object of my invention is to embody means in the type of leverage mechanism referred to which will insure that the operative leverage ratio will not become inoperative until the succeeding leverage ratio is positively caused to become operative.

Other objects of my invention will become apparent from the following description taken in connection with the accompanying drawing in which Figure 1 is a view showing my improved leverage ratio changing mechanism associated with a hand lever, parts being broken away; and Figure 2 is a cross-sectional view taken on the line 2—2 of Figure 1.

Referring to the figures in detail, numeral 1 indicates a hand lever formed with a bifurcated end providing arms 2. The lever is pivotally mounted intermediate its ends to a suitable support 3 by means of a pin 4. A sector plate 5 extends between the arms 2 of the lever and is secured to the support by the pin 4 and a separate attaching bolt 6. The pin 4 also has pivotally mounted thereon an arm 7 extending to a point adjacent the lower ends of arms 2 which have secured therebetween a curved member 8.

The member to be actuated is shown as a shaft 9 which is mounted on a support and capable of operating any desired mechanism or device. An arm 10 is secured to the shaft and pivotally connected at its free end is a lever 11. The end of the arm 12 of lever 11 is connected to member 8 carried by the hand lever by means of two parallel links 13. The upper arm 14 of lever 11 is connected by two parallel links 15 to a control pawl 16 pivotally carried on the end of arm 7. This control pawl is formed with an extension 17 which normally abuts the end of member 8 and connected between this extension and the links 15 is a spring 18. The forward end of the pawl is provided with a shoulder 19 and a tooth 20, the shoulder cooperating with the end of member 8 and the tooth adapted to cooperate with teeth 21 on the lower edge of plate 5. The distance between the tips of the shoulder and tooth of pawl 16 is so related to the distance between the lower edge of the plate and the upper surface of member 8 that shoulder 19 will be held in engagement with the end of member 8 until tooth 20 reaches a point opposite teeth 21. Also, when tooth 20 is in cooperative engagement with a tooth 21, it will be held in such engagement if member 8 is moved relative to the pawl so that shoulder 19 engages the inner curved surface of said member 8. The plate 5 is provided with a curved slot 22 having teeth 23 on its lower edge. A pawl 24 is pivotally mounted on arms 2 of the hand lever and lies within slot 22 for cooperation with teeth 23 in order to hold the lever in a plurality of operative positions. The pawl 24 is controlled by a rod 25 which extends to the upper end of the hand lever whereby the pawl may be controlled by the hand of the operator when grasping the lever.

The position of the parts when the mechanism is in inoperative position is shown in Figure 1. When it is desired to operate shaft 9, the upper end of lever 1 is grasped by the hand of the operator and moved in a clockwise direction as indicated by the arrow. Since shoulder 19 is in engagement with the end of member 8 and cannot be disengaged therefrom because tooth 20 is cooperating with the smooth curved edge of plate 5, all the pull links 13 and 15 will be moved simultaneously by the lower end of the lever. This will cause shaft 9 to be rotated by the arm 10 and by a leverage corresponding to the length of said arm.

When the hand lever 1 has been moved sufficiently to bring tooth 20 opposite a tooth 21 on plate 5, shoulder 19 of the pawl will be free to become disengaged from member 8. Disengagement, however, will not take place until the force being transmitted by the links 15 is of such value that it will be able to overcome the tension of spring 18 and cause the pawl to be swung in a clockwise direction about its pivotal connection with the arm 7. When tooth 20 engages a tooth 21, shoulder 19 will become disengaged from member 8. The pawl 16 will now be no longer moved by lever 1 and since links 15 are connected to this pawl, they also will not be moved. Continued movement of lever 1 will result in links 13 rotating lever 11 about the pivotal connection between said lever and links 15. Since lever 11 is connected to arm 10, this arm will be operated through lever 11 and at a higher leverage ratio than was the case when lever 11 was being moved by links 13 and 15. When lever 1 has been moved as far as desired, pawl 24 will engage a tooth 23 and hold the lever in this position.

It is to be noted that when tooth 20 engages a tooth 21, it cannot become disengaged from this tooth as long as the hand lever is continued to be moved since shoulder 19 will so cooperate with the member 8 that pawl 16 cannot move.

When it is desired to release the hand lever, pawl 24 is disengaged from its tooth 23, thereby permitting lever 1 to be rotated in a counterclockwise direction. When the hand lever has been moved to a position where shoulder 19 can drop into cooperative engagement with the end of member 8, spring 18 will be free to pull tooth 20 out of engagement with its cooperating tooth 21. In the event the spring should fail to perform this function, member 8 will engage the extension 17 on pawl 16 and positively force the tooth 20 out of engagement. Continued movement of the lever will again place the elements in the position shown in Figure 1.

The construction just described is such that the change-over from one leverage ratio to the other cannot take place until after the hand lever has moved a predetermined angle since teeth 21 are not opposite the inoperative position of tooth 20. Thus it is possible for the operator to initially jerk the lever 1 and cause the change-over to take place prior to the time when it is desired that such change-over take place. If the force being transmitted through links 15 does not reach a value sufficient to make the change-over when tooth 20 reaches the first tooth 21, there will be no change-over until such force reaches the necessary value to stretch spring 18 and cause the change-over to take place.

My improved lever mechanism has been found to be very useful in applying brakes. The first movement of the hand lever will cause the friction element of the brake to be brought into engagement with the drum at the low leverage ratio which is the desired operation. The change-over to the higher leverage ratio will take place as soon as the greater force is necessary to apply pressure to the friction element and force it into engagement with the drum. The wear of the friction element will have no effect in altering the time of the change-over. Also, it is impossible to cause the change-over to take place at the beginning of the movement of the hand lever and as a result of a quick jerk on said lever.

Being aware of the possibility of modifications in the particular construction herein described without departing from the fundamental principles of my invention, I do not intend that its scope be limited except as set forth by the appended claims.

Having fully described my invention, what I claim as new and desire to secure by Letters Patent of the United States is:

1. In leverage ratio changing mechanism, a member to be actuated, a pivotally mounted lever, a fixed member, means for transmitting force from said lever to the actuated member at a given leverage ratio, other means including a portion of the first named means for transmitting force from said lever to the actuated member at another leverage ratio, means comprising a pivoted control member for engaging the lever and causing said first named means to be operative until a predetermined force is transmitted to the actuated member and then to automatically engage the fixed member and cause the second named means to be operative, and means for locking said control member in the position wherein the second named means is operative.

2. In leverage changing mechanism, a member to be actuated, a pivotally mounted lever, means for transmitting force from said lever to the actuated member at a given leverage ratio, other means including a portion of the first named means for transmitting force from said lever to the actuated member at another leverage ratio, means comprising a pivoted pawl so mounted as to engage the lever and cause said first named means to be operative until a predetermined force is transmitted to the actuated member and then to become automatically disengaged from the lever and assume another operative position to cause the second named means to be operative, and means carried by the lever for locking said pawl in a position wherein the second named means is operative.

3. In leverage ratio changing mechanism, a member to be actuated, a lever connected to the actuated member, a manually operable lever, a force transmitting member connecting the manually operable lever to one end of the first named lever, a second force transmitting member connected to the other end of the lever, a pawl for connecting the second force transmitting member to the manually operable lever, a fixed member, and means for disconnecting the pawl from the manually operable lever and connecting it to the fixed member when the actuated member offers a predetermined resistance to movement.

4. In leverage ratio changing mechanism, a member to be actuated, a lever connected to the actuated member, a manually operable lever, a force transmitting member connecting the manually operable lever to one end of the first named lever, a second force transmitting member connected to the other end of the lever, a pawl for connecting the second force transmitting member to the manually operable lever, a fixed member, means for disconnecting the pawl from the manually operable lever and connecting it to the fixed member when the actuated member offers a predetermined resistance to movement, and means for locking the pawl in engagement with the fixed member.

5. In leverage ratio changing mechanism, a member to be actuated, a lever intermediately pivoted to the actuated member, a pivotally mounted manually operable lever, a fixed member adjacent the manually operable lever, means for connecting one end of said first named lever to the manually operable lever, and means controlled by the resistance to movement offered by the actuated member for causing the other end of the first named lever to be moved by the manually operable lever or to be held stationary.

6. In leverage ratio changing mechanism, a member to be actuated, a lever intermediately pivoted to the actuated member, a pivotally mounted manually operable lever, a fixed member adjacent the manually operable lever, means for connecting one end of said first named lever to the manually operable lever, means comprising a pawl controlled by the resistance to movement offered by the actuated member for connecting the other end of the first named lever to the manually operable lever or the fixed member, and means for locking the pawl in its operative positions.

7. In leverage ratio changing mechanism, a member to be actuated, a lever intermediately pivoted to the actuated member, a pivotally mounted hand lever, a fixed member adjacent the hand lever, means for connecting one end of said first named lever to the hand lever, means for alternately connecting the other end of said first named lever to the hand lever and the fixed member, said means comprising a pawl which is operated when a predetermined force is transmitted through the second connecting means, and means for preventing said pawl from being operated until said hand lever has been moved through a predetermined distance.

8. In leverage ratio changing mechanism, a lever to be actuated, a second lever intermediately pivoted to the actuated lever, a pivotally mounted hand lever, a fixed member adjacent the hand lever, means for connecting one end of said second lever to the hand lever, means for alternately connecting the other end of the second lever to the hand lever and to the fixed member, said means comprising a pawl which is operated when a predetermined force is transmitted through the second connecting means, and manually-controlled means for holding the hand lever in a plurality of operative positions.

9. In leverage ratio changing mechanism, a member to be actuated, a lever intermediately pivoted to the actuated member, a pivitolly mounted hand lever, a fixed toothed plate adjacent the hand lever, a link for connecting one end of said first named lever and the hand lever, means comprising a second link and a pawl for connecting the other end of the first named lever either to the hand lever or to a tooth of the plate, said pawl normally connecting the second link to the hand lever but being automatically movable to connect said link to the toothed plate when the actuated member offers a predetermined resistance to movement.

10. In leverage ratio changing mechanism, a member to be actuated, a lever intermediately pivoted to the actuated member, a pivotally mounted hand lever, a fixed toothed plate adjacent the hand lever, a link for connecting one end of said first named lever and the hand lever, means comprising a second link and a pawl for connecting the other end of the first named lever either to the hand lever or to a tooth of the plate, said pawl normally connecting the second link to the hand lever but being automatically movable to connect said link to the toothed plate when the actuated member offers a predetermined resistance to movement, and means carried by the hand lever for locking the pawl in engagement with the toothed plate when the hand lever transmits force only through the first link.

11. In leverage ratio changing mechanism, a lever to be actuated, a second lever intermediately pivoted to the actuated lever, a pivotally mounted hand lever, a fixed toothed plate adjacent the hand lever, a link for connecting one end of said second lever and the hand lever, means comprising a second link and a pawl for connecting the other end of the second lever either to the hand lever or to a tooth of the plate, said pawl normally connecting the second link to the hand lever but being automatically movable to connect said link to the toothed plate when the actuated lever offers a predetermined resistance to movement, and means for preventing said pawl from being connected to the toothed plate until the hand lever has been moved through a predetermined angle.

12. In leverage ratio changing mechanism, a lever to be actuated, a second lever intermediately pivoted to the actuated lever, a pivotally mounted hand lever, a fixed toothed plate adjacent the hand lever, a link for connecting one end of said second lever and the hand lever, an arm pivoted coaxially with the hand lever, a pawl pivotally carried by the arm and provided with opposed teeth for alternately connecting it with the hand lever or the toothed plate, a second link connected to the other arm of the second lever and to the pawl at a point on one side of its pivotal connection with the arm, and a spring connected to the second link and the pawl and normally biasing it to a position causing the pawl to connect the second link to the hand lever but permitting said pawl to be moved to a position connecting said second link to the toothed plate when the force transmitted through said link is greater than a predetermined value.

STEVE SCHNELL.